(12) United States Patent
Waas

(10) Patent No.: US 8,907,903 B2
(45) Date of Patent: Dec. 9, 2014

(54) HANDING CONTROL OF AN OBJECT FROM ONE TOUCH INPUT TO ANOTHER TOUCH INPUT

(75) Inventor: Erich Peter Waas, San Marcos, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 963 days.

(21) Appl. No.: 13/006,337

(22) Filed: Jan. 13, 2011

(65) Prior Publication Data

US 2012/0182224 A1    Jul. 19, 2012

(51) Int. Cl.
  *G06F 3/041* (2006.01)
  *G06F 3/0488* (2013.01)
  *G06F 3/0486* (2013.01)

(52) U.S. Cl.
  CPC .......... *G06F 3/04883* (2013.01); *G06F 3/0486* (2013.01)
  USPC .......................................... 345/173; 345/178

(58) Field of Classification Search
  USPC .................. 345/156–184; 382/162; 324/680; 455/566
  See application file for complete search history.

(56) References Cited

U.S. PATENT DOCUMENTS

| | | | |
|---|---|---|---|
| 5,119,079 A | 6/1992 | Hube et al. | |
| 5,231,698 A | 7/1993 | Forcier | |
| 5,342,047 A | 8/1994 | Heidel et al. | |
| 5,347,295 A | 9/1994 | Agulnick et al. | |
| 5,379,057 A | 1/1995 | Clough et al. | |
| 5,526,422 A | 6/1996 | Keen | |
| 5,555,104 A | 9/1996 | Todaka | |
| 5,575,717 A | 11/1996 | Houriet et al. | |
| 5,612,719 A | 3/1997 | Beemink et al. | |
| 5,655,136 A | 8/1997 | Morgan | |
| 5,675,362 A | 10/1997 | Clough et al. | |
| 5,694,150 A | 12/1997 | Sigona et al. | |
| 5,717,939 A | 2/1998 | Bricklin et al. | |
| 5,818,451 A | 10/1998 | Bertram et al. | |
| 5,821,930 A | 10/1998 | Hansen | |
| 5,832,113 A | 11/1998 | Sano | |
| 5,844,547 A | 12/1998 | Minakuchi et al. | |
| 5,889,236 A | 3/1999 | Gillespie et al. | |
| 5,910,800 A | 6/1999 | Shields et al. | |
| 5,910,802 A | 6/1999 | Shields et al. | |
| 5,950,045 A | 9/1999 | Nomura et al. | |

(Continued)

OTHER PUBLICATIONS

Patent Cooperation Treaty; "Notification of Transmittal of the International Search Report and the Written Opinion of the International Searching Authority, or the Declaration" issued in PCT/US12/20495, mailed May 1, 2012; 2 pages.

(Continued)

*Primary Examiner* — Prabodh M Dharia
(74) *Attorney, Agent, or Firm* — Fitch, Even, Tabin & Flannery, LLP

(57) ABSTRACT

A method for switching control of object is provided including displaying an object on a screen, controlling movement of the object in response to a first touch input, detecting a request for switching control of the object from the first touch input to a second touch input, determining whether a location of the first touch input and a location of the second touch input are within a merge area and switching control of the object from the first touch input to the second touch input in response to the location of the first touch input and the location of the second touch input being within the merge area.

28 Claims, 8 Drawing Sheets

(56) References Cited

U.S. PATENT DOCUMENTS

| | | | |
|---|---|---|---|
| 5,977,957 | A | 11/1999 | Miller et al. |
| 5,996,080 | A | 11/1999 | Silva et al. |
| 6,049,329 | A | 4/2000 | Zetts et al. |
| 6,073,036 | A | 6/2000 | Heikkinen et al. |
| 6,121,960 | A | 9/2000 | Carroll et al. |
| 6,130,665 | A | 10/2000 | Ericsson |
| 6,154,214 | A | 11/2000 | Uyehara et al. |
| 6,157,372 | A | 12/2000 | Blackburn et al. |
| 6,211,856 | B1 | 4/2001 | Choi et al. |
| 6,271,829 | B1 | 8/2001 | Ricotta et al. |
| 6,278,443 | B1 | 8/2001 | Amro et al. |
| 6,304,261 | B1 | 10/2001 | Shields et al. |
| 6,313,853 | B1 | 11/2001 | Lamontagne et al. |
| 6,335,725 | B1 | 1/2002 | Koh et al. |
| 6,335,726 | B1 | 1/2002 | Ilan et al. |
| 6,359,572 | B1 | 3/2002 | Vale |
| 6,411,283 | B1 | 6/2002 | Murphy |
| 6,466,203 | B2 | 10/2002 | Van Ee |
| 6,501,464 | B1 | 12/2002 | Cobbley et al. |
| 6,518,957 | B1 | 2/2003 | Lehtinen et al. |
| 6,545,669 | B1 | 4/2003 | Kinawi et al. |
| 6,590,567 | B1 | 7/2003 | Nagao et al. |
| 6,590,568 | B1 | 7/2003 | Astala et al. |
| 6,597,345 | B2 | 7/2003 | Hirshberg |
| 6,608,637 | B1 | 8/2003 | Beaton et al. |
| 6,624,832 | B1 | 9/2003 | Thomas |
| 6,633,746 | B1 | 10/2003 | Walsh et al. |
| 6,639,584 | B1 | 10/2003 | Li |
| 6,657,615 | B2 | 12/2003 | Harada |
| 6,661,409 | B2 | 12/2003 | Demartines et al. |
| 6,784,873 | B1 | 8/2004 | Boesen et al. |
| 6,791,536 | B2 | 9/2004 | Keely et al. |
| 6,795,059 | B2 | 9/2004 | Endo |
| 6,882,337 | B2 | 4/2005 | Shetter |
| 6,903,722 | B2 | 6/2005 | Ohmori et al. |
| 6,926,609 | B2 | 8/2005 | Martin |
| 6,934,156 | B2 | 8/2005 | Canova et al. |
| 6,956,562 | B1 | 10/2005 | O'Hara et al. |
| 6,975,306 | B2 | 12/2005 | Hinckley et al. |
| 7,003,308 | B1 | 2/2006 | Fuoss et al. |
| 7,061,474 | B2 | 6/2006 | Hinckley et al. |
| 7,084,859 | B1 | 8/2006 | Pryor |
| 7,103,852 | B2 | 9/2006 | Kairis, Jr. |
| 7,130,778 | B1 | 10/2006 | Connell et al. |
| 7,158,123 | B2 | 1/2007 | Myers et al. |
| 7,224,991 | B1 | 5/2007 | Fuoss et al. |
| 7,250,939 | B2 | 7/2007 | Lira |
| 7,274,353 | B2 | 9/2007 | Chiu et al. |
| 7,292,206 | B2 | 11/2007 | Numano |
| 7,292,230 | B2 | 11/2007 | Tokkonen |
| 7,319,457 | B2 | 1/2008 | Lin et al. |
| 7,339,580 | B2 | 3/2008 | Westerman et al |
| 7,345,675 | B1 | 3/2008 | Minakuchi et al. |
| 7,345,679 | B2 | 3/2008 | Katayose |
| 7,348,998 | B2 | 3/2008 | Belz |
| 7,355,620 | B2 | 4/2008 | Ikehata et al. |
| 7,385,592 | B2 | 6/2008 | Collins |
| 7,403,192 | B2 | 7/2008 | Lai |
| 7,408,538 | B2 | 8/2008 | Hinckley et al. |
| 7,443,316 | B2 | 10/2008 | Lim |
| 7,446,754 | B2 | 11/2008 | Ausbeck, Jr. |
| 7,446,783 | B2 | 11/2008 | Grossman |
| 7,450,114 | B2 | 11/2008 | Anwar |
| 7,453,443 | B2 | 11/2008 | Rytivaara et al. |
| 7,469,381 | B2 | 12/2008 | Ording |
| 7,471,890 | B2 | 12/2008 | Lee et al. |
| 7,474,299 | B1 | 1/2009 | O'Hara et al. |
| 7,479,948 | B2 | 1/2009 | Kim et al. |
| 7,479,949 | B2 | 1/2009 | Jobs et al. |
| 7,480,870 | B2 | 1/2009 | Anzures et al. |
| 7,489,305 | B2 | 2/2009 | Salisbury et al. |
| 7,509,588 | B2 | 3/2009 | Van Os et al. |
| 7,515,142 | B2 | 4/2009 | Park |
| 7,525,537 | B2 | 4/2009 | Abdallah et al. |
| 7,602,378 | B2 | 10/2009 | Kocienda et al. |
| RE40,993 | E | 11/2009 | Westerman |
| 7,626,580 | B2 | 12/2009 | Keely et al. |
| 7,642,933 | B2 | 1/2010 | Patel |
| 7,653,883 | B2 | 1/2010 | Hotelling et al. |
| 7,656,316 | B2 | 2/2010 | Lazaridis et al. |
| 7,656,393 | B2 | 2/2010 | King et al. |
| 7,657,849 | B2 | 2/2010 | Chaudhri et al. |
| 7,659,526 | B2 | 2/2010 | Zani et al. |
| 7,705,832 | B2 | 4/2010 | Funamoto |
| 7,719,523 | B2 | 5/2010 | Hillis |
| 7,743,348 | B2 * | 6/2010 | Robbins et al. ............... 715/863 |
| 7,760,187 | B2 | 7/2010 | Kennedy |
| 7,782,307 | B2 | 8/2010 | Westerman |
| 7,782,309 | B2 | 8/2010 | Janik |
| 7,786,975 | B2 | 8/2010 | Ording et al. |
| 7,825,909 | B2 | 11/2010 | Niida |
| 7,834,861 | B2 | 11/2010 | Lee |
| 7,844,915 | B2 | 11/2010 | Platzer et al. |
| 7,941,758 | B2 | 5/2011 | Tremblay |
| 8,471,570 | B2 * | 6/2013 | Portmann ..................... 324/662 |
| 2006/0001650 | A1 * | 1/2006 | Robbins et al. ............... 345/173 |
| 2008/0075363 | A1 * | 3/2008 | Matsuzaki et al. ........... 382/162 |
| 2008/0291173 | A1 * | 11/2008 | Suzuki .......................... 345/173 |
| 2010/0105443 | A1 * | 4/2010 | Vaisanen ....................... 455/566 |
| 2010/0245275 | A1 * | 9/2010 | Tanaka .......................... 345/173 |
| 2010/0315102 | A1 * | 12/2010 | Portmann ..................... 324/680 |
| 2011/0074694 | A1 * | 3/2011 | Rapp et al. ................... 345/173 |
| 2012/0212438 | A1 * | 8/2012 | Vaisanen ....................... 345/173 |
| 2013/0069860 | A1 * | 3/2013 | Davidson ...................... 345/156 |
| 2013/0120248 | A1 * | 5/2013 | Gilra et al. .................... 345/157 |
| 2013/0201139 | A1 * | 8/2013 | Tanaka .......................... 345/173 |

OTHER PUBLICATIONS

Patent Cooperation Treaty; "International Search Report" issued in PCT/US12/20495, mailed May 1, 2012; 5 pages.

Patent Cooperation Treaty; "Written Opinion of the International Searching Authority" issued in PCT/US12/20495, mailed May 1, 2012; 5 pages.

Patent Cooperation Treaty; Notification Concerning Transmittal of Copy of International Preliminary Report on Patentability and International Preliminary Report on Patentability, mailed Jul. 25, 2013, 7 pages.

* cited by examiner

HANDING CONTROL OF AN OBJECT FROM ONE TOUCH INPUT TO ANOTHER TOUCH INPUT

BACKGROUND OF THE INVENTION

1. Field of the Invention

The present invention relates generally to touchpad and touchscreen technology, and more specifically to the control and/or movement of a displayed object by a user interacting with one or more touchpads, touchscreens, and/or other touch sensitive panels.

2. Discussion of the Related Art

A touchscreen is a type of display that can detect the presence and location of a touch within the display area. A touchpad is a pointing device that includes a specialized surface that can translate the motion and position of a user's finger (or other object) to a relative position on a separate display screen. Various types of electronic and computing devices employ touchscreen or touchpad technology to enable a user to control and/or move displayed objects, such as for interacting with a graphical user interface.

SUMMARY OF THE INVENTION

In one embodiment, the invention can be characterized as a method, comprising displaying an object on a screen, controlling movement of the object in response to a first touch input, detecting a request for switching control of the object from the first touch input to a second touch input, determining whether a location of the first touch input and a location of the second touch input are within a merge area and switching control of the object from the first touch input to the second touch input in response to the location of the first touch input and the location of the second touch input being within the merge area.

In another embodiment, the invention can be characterized as an apparatus, comprising a housing having a size intended for handheld use, a first touch sensitive panel attached to a first surface of the housing and a processor based system included in the housing configured to perform steps comprising displaying an object on a screen, controlling movement of the object in response to a first touch input on the first touch sensitive panel, detecting a request for switching control of the object from the first touch input to a second touch input, determining whether a location of the first touch input and a location of the second touch input are within a merge area and switching control of the object from the first touch input to the second touch input in response to the location of the first touch input and the location of the second touch input being within the merge area.

In a further embodiment, the invention may be characterized as a computer readable storage medium storing one or more computer readable programs adapted to cause a processor based system to execute steps comprising displaying an object on a screen, controlling movement of the object in response to a first touch input, detecting a request for switching control of the object from the first touch input to a second touch input, determining whether a location of the first touch input and a location of the second touch input are within a merge area and switching control of the object from the first touch input to the second touch input in response to the location of the first touch input and the location of the second touch input being within the merge area.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
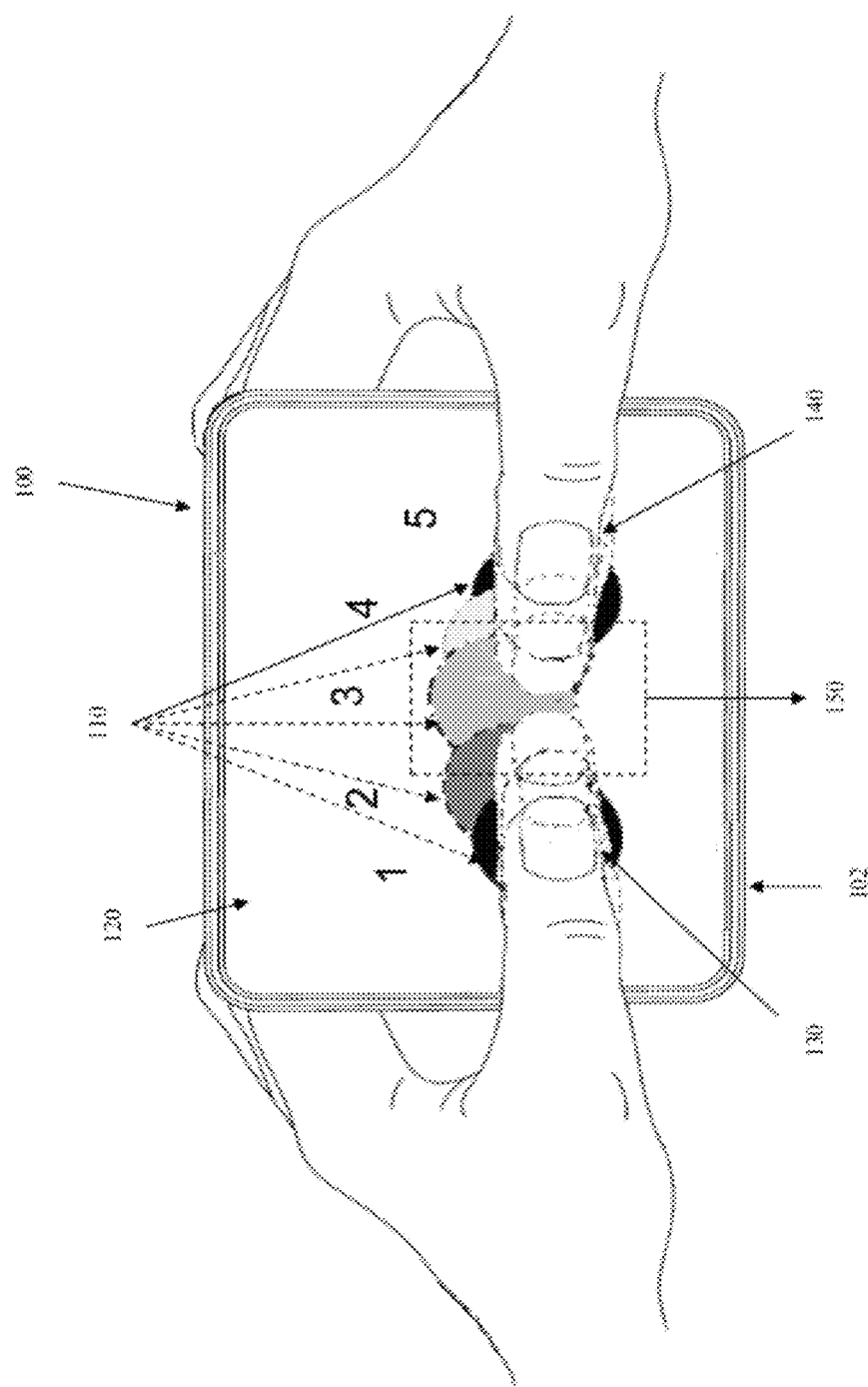
FIG. 1 illustrates an exemplary touch sensitive device displaying an object, according to one or more embodiments of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

An example of a type of device that may employ touchscreen technology is a handheld device, such as a smartphone or portable gaming device. Such a device may include a touchscreen for controlling the functions of the device. To provide the user with a large display area, a user friendly functional controller, or for other reasons, the device may be built such that the user is not able to traverse the entire touchscreen using a single hand. In such instances, the user is often unable to move an object from one side of the display to the other side of the display without incurring some difficulty.

In some embodiments of the present invention, there is provided a method of seamless continuous control of a displayed object using a touch sensitive panel, such as a touchscreen, touchpad, or other type of touch sensitive panel. The seamless continuous control of a displayed object is provided by allowing the switching of control between two different inputs on the touch sensitive panel. In one embodiment, for example, the invention provides a method of switching control between a first "touch input" provided by a right hand of the user to a second "touch input" provided by the left hand of the user. In another embodiment, the invention provides a method of tossing/pitching an object from one "touch input", e.g. right hand of the user, to a second "touch input", i.e., left hand of the user.

Referring first to FIG. 1, an exemplary touch sensitive device displaying an object is illustrated according to one or more embodiments of the present invention.

As illustrated, in this exemplary embodiment, a user is interacting with an application that is running on a device 100. The device 100 may comprise any type of device, such as a handheld computing device or a controller for an external device or system not shown. Examples of handheld computing devices include, but are not limited to, mobile devices and telephones, cellular devices and telephones, smartphone, personal digital assistants (PDA), tablet or pad-like computers, handheld computers or simply "handhelds", palmtop devices and computers, portable gaming and/or entertainment devices, pocket personal computers, etc. Examples of controllers for external devices or systems include, but are not limited to, game system controllers, entertainment system controllers, TV remote controls, etc. The application that is running on the device 100 may comprise any type of application, such as a game or other entertainment application, or an email, telephone or other communication application, or an organizer such as an address book, or any other type of application.

The device 100 is shown as being a rectangular shaped device, having a touch sensitive screen, wherein the touch sensitive screen comprises a display for viewing the application as it is being manipulated. In the illustrated embodiment, the handheld device 100 comprises a housing 102, and further comprises at least one touch sensitive panel 120 attached to the housing 102 of the handheld device. In one embodiment, the housing 102 may have a size intended for hand-held use. In one embodiment, the device 100 may further comprise a processor based system configured to perform one or more methods as discussed in more detail below. In some embodiments, the device 100 may comprise a touchpad on one side of the device and a conventional (non-touch sensitive) display screen on the other side of the device for viewing the application. In still other embodiments, the device 100 may only comprise a touchpad, and the application may be displayed on an external device such as a TV.

In general, in some embodiments, a sliding move may be done on a touch sensitive panel in a way that allows the user to switch between right and left hand fingers. For example, an object may be displayed on any display screen associated with the device 100, such as a touch sensitive or non-touch sensitive display screen attached to the device 100, or a touch sensitive or non-touch sensitive display screen external to the device 100. The user uses a first finger to select and move the displayed object using a touch sensitive panel attached to the device 100, such as a touchscreen located on either side of the device 100, or a touchpad located on either side of the device 100. This first finger is referred to herein as a first touch input.

Next, the user touches the touch sensitive panel with a second finger to which the user wants to hand-off the displayed object. This second finger is referred to herein as a second touch input. A processing system associated with device 100 tracks the first finger moving the object and ignores the user's second finger until the two finger touch areas merge, at which point the hand-off takes place. After that point the system tracks the user's second finger and moves the object in accordance with movements of the second finger.

In some embodiments, the switching between the first and second touch inputs is accurately done by allowing the second touch input that is not tied to an on-screen object to merge with the first touch input that is controlling the object. At the time of the merge, the two individual touches are counted as a single touch. When the first finger that was controlling the object no longer touches the touch sensitive panel, the hand-off is complete and the "new" (i.e. second) finger/touch now controls the object.

More specifically, referring to FIG. 1, in one embodiment the user is controlling a displayed object 110 using a first touch input 130, e.g. the left hand as shown. As shown, the user is able to move the object from a first position (1) to a third position (3) using his/her first finger. As shown, in position 3, the user's left finger is fully extended. Accordingly, the user would have to extend his hand in order to further control the object 110 using the same hand, and may further lose grasp of the object.

In one embodiment, when the user is in position (3) the system detects a hand-off of the object. Example embodiments of the details of detecting a request for handoff are further described below with respect to FIGS. 2-4. Next the system determines if the object 110 and a second input source are within a merge area 150, and the control of the object is switched from the first input 130 to the second input 140. In one embodiment, an indication of the first input and the second input may be displayed to the user in order to help the user place the second input where the hand-off can occur. For example, in one embodiment, the object is displayed and indicates the position of the input controlling the object. In one embodiment, an indication of the second input is also displayed on the screen so that the user is able to view the location of the inputs in relation to one another and in relation to the object. With the detection of the hand-off request, the system begins the process of switching control from the first input to the second input.

As shown, the user's second hand 140 in this exemplary embodiment represents the second input. In one embodiment, the location of the second touch input 140 (right hand) of the user is determined by the system, and compared against the location of the first touch input 130 (left hand) and/or the location of the object 110, e.g. position (3). As shown in the exemplary embodiment of FIG. 1, at position (3) the location of both the first input, the second input and the object, are within the merge area 150. In such embodiment, the user is controlling the object with the first input until the second input is entered and the switch is completed. Therefore, in this exemplary embodiment when the object is at the position (3), the system will proceed to switch control of the object from the first input 130, i.e. user's left hand/finger, to the second input, i.e., user's right hand/finger 140.

In another embodiment, the user may release the object momentarily before the control of the object is switched to the second input 140. In such embodiments, the system may allow a predetermined time where the object remains at the last position of the first input after the first input has been removed, and when the second input is entered the control will be switched to the second input. In such embodiment, the location of the second touch input 140 (right hand) of the user is determined by the system, and compared against the location of the object 110, e.g. position (3). In one embodiment, the location of the object is the last known location of the first input. In such embodiment when the second input reaches the location of the object, e.g. position (3), the system will proceed to give control of the object to the second input 140, i.e., user's right hand/finger 140.

In some embodiments, as shown in FIG. 1, after control has been switched according to the process 200 and/or 300 described below, the second input 140 may then begin control of the object and as shown, may move the object across the screen, e.g. from position (3) to a second and third position (4) and (5).

In the above example the touch inputs comprise the user's thumbs touching the touch sensitive panel. It should be well understood that the touch inputs may comprise any fingers, hand, toes, or any other body part touching the touch sensitive panel. It should also be well understood that the touch inputs may comprise touching the touch sensitive panel with any object, such as a stylus.

Figure 2:
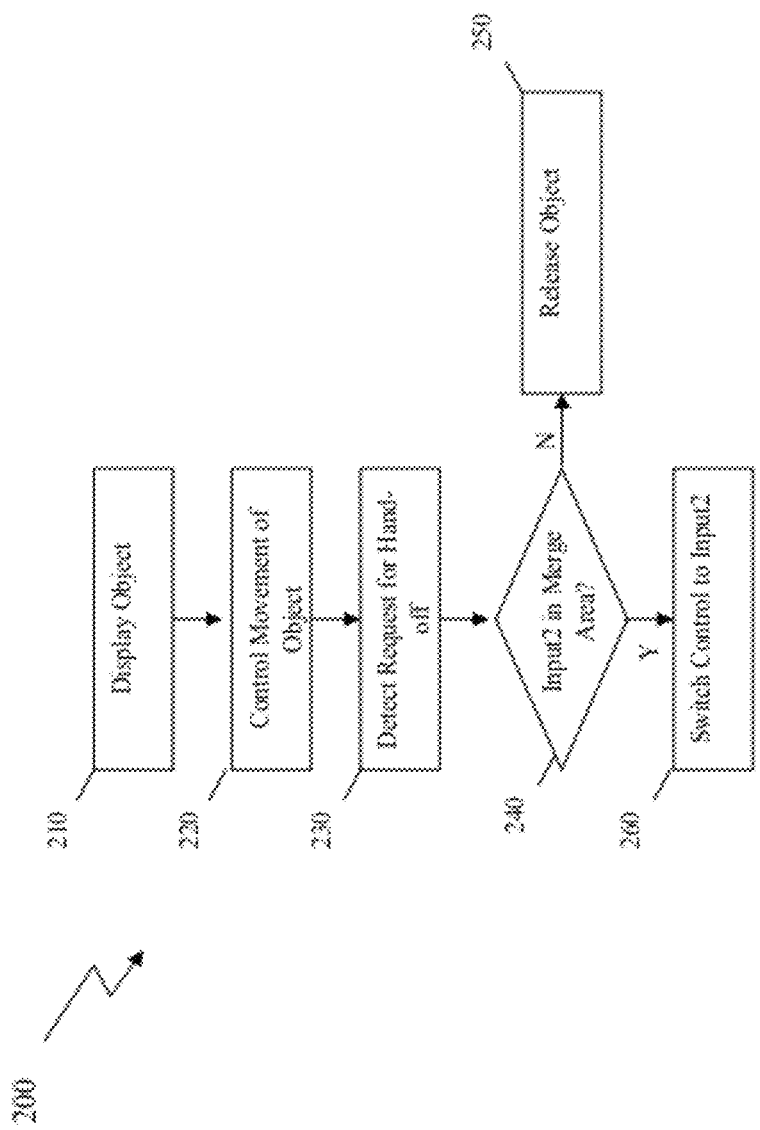
FIG. 2 illustrates a flow diagram of a method for switching control between a first input and a second input, according to several embodiments of the present invention.

Referring next to FIG. 2, a flow diagram of a simplified method 200 of switching control between a first touch input and a second touch input is illustrated. First, in step 210, an object is displayed on a screen. For example, an object may be displayed on any display screen associated with the device 100, such as a touch sensitive or non-touch sensitive display screen attached to the device 100, or a touch sensitive or non-touch sensitive display screen external to the device 100. In one embodiment the screen is attached to a handheld device. In one embodiment, the screen may be a touch screen display. In other embodiments, the screen is external to the device. Next, in step 220 a first touch input is received to control the movement of the object. For example, in one embodiment, the handheld device comprises a housing, and further comprises at least one touch sensitive panel attached to the housing of the handheld device. In one embodiment, the panel further comprises display capability, where in such embodiments the object is displayed on the touch panel. In one embodiment, the touch input is received by a user placing a finger on the screen and moving the object. In another embodiment, an alternate touch input device such as a pen or stylus may be used by the user. In step 220 the system receives the input and controls the movement of the object according to the touch input. In one embodiment, for example, a user guides an object by placing his/her finger on the object and moving the object across the screen.

Next, in step 230, a request for handoff is detected at the handheld device. For example, in one embodiment, a request is detected when the user's first touch input ceases control of the object. That is, in one embodiment, the user may be controlling the object using a first hand, e.g. right hand, and may reach a point at which the user cannot comfortably control the object using that hand, at such time the user may lift his/her hand, and such cease of control may trigger the system to recognize a request for handoff. In another embodiment, there may be a predefined gesture, such as a single or double click that may be interpreted by the system as the request for handoff.

In yet another embodiment, the system may monitor the speed of the movement of the object by the first input and when the system detects an unaccepted change in the speed of the movement of the object, the change may be interpreted as a request for handoff. In another embodiment, the system detects a second touch input on the touch sensitive panel and the detection is interpreted as a request for handing off control between the first input and second input. For example, in an embodiment where the user is controlling the object using a first touch input, e.g. first finger, at some point the user may place another touch input, e.g. a second finger on the touch sensitive panel, and the system may interpret this as a request for switching control from a first touch input to a second touch input. In another embodiment, the system may detect the request for handoff once the object has passed a predefined threshold area. For example, in one embodiment, a system may assign a half way point, where it is determined that the control should be switched from one hand to another. In other embodiments, a combination of such methods may be used by the system to detect a request for hand-off.

Next, in step 240 the system determines whether the second input is detected within the merge area. As stated above, in one embodiment, one or both the first input and the second input are touch inputs. In one embodiment, the merge area is defined as an area within which the control can be switched between the first input and the second input. In one embodiment, the merge area defines an area where the second input is at a location proximate to the object such that the control of the object can be passed to the second input. In one embodiment, the merge area may be a predefined area for the particular application that is running and/or the overall system. That is, the application developer and or system developer may designate a position on the input panel or screen defined as the merge area. In another embodiment, the merge area may be calculated relative to one or more of the location of the first input, the second input and/or the location of the object. In one embodiment, the location of the first input, the second input and/or the object is determined at the time the request is detected. In another embodiment, the merge area is calculated as a distance between the first input and the second input, a distance between the object and the second input, a radius around the second input, a radius around the first input, a radius around the object, or some combination thereof. In some embodiments, the speed of movement of the object by the first input, as well as other variables may be taken into account when calculating the merge area.

If in step 240 it is determined that the second input is detected within the merge area, then in step 250 the system switches control of the object to the second input. In one embodiment, for example, in step 250 the control of the object is released from the first input and switched to the second input. In another embodiment, the first input may have released the object and the second input may gain control of the object in step 250. In such embodiment, once the object is released from the control of the first input, the object will remain at the last location of the first input, until the control is switched to the second input in step 250.

After this step is completed, the second input has control of the object in the application, for example, until another hand-off request is detected. In one embodiment, prior to step 250, there may be a period of time where the object is not being controlled by either of the first or second input. In some embodiments, the system may automatically control the object during this time until the control is switched from the first input to the second input. In one embodiment, during automatic control the position of the object may be fixed at the position where the first input ceased control of the object. In another embodiment, the system may automatically move the object, based on several different variables such as the speed of movement and/or direction of movement of the object prior to the handoff request in step 210, location of the second input, the context of the application, predefined user or system settings, etc.

Alternatively, when it is determined that the second input is not detected within the merge are, in step 260, the object is released from control. In one embodiment, the system may wait for a predetermined time before releasing the object during which the system will continuously monitor the location of the second input to determine if the location is within the merge area. In another embodiment, the system may notify the user before releasing the object. In one embodiment, after the object is released, it is returned to its original position before it was controlled by the first input. In another embodiment, the object remains at its current location, i.e. last known location of the first input, after being released.

Figure 3:
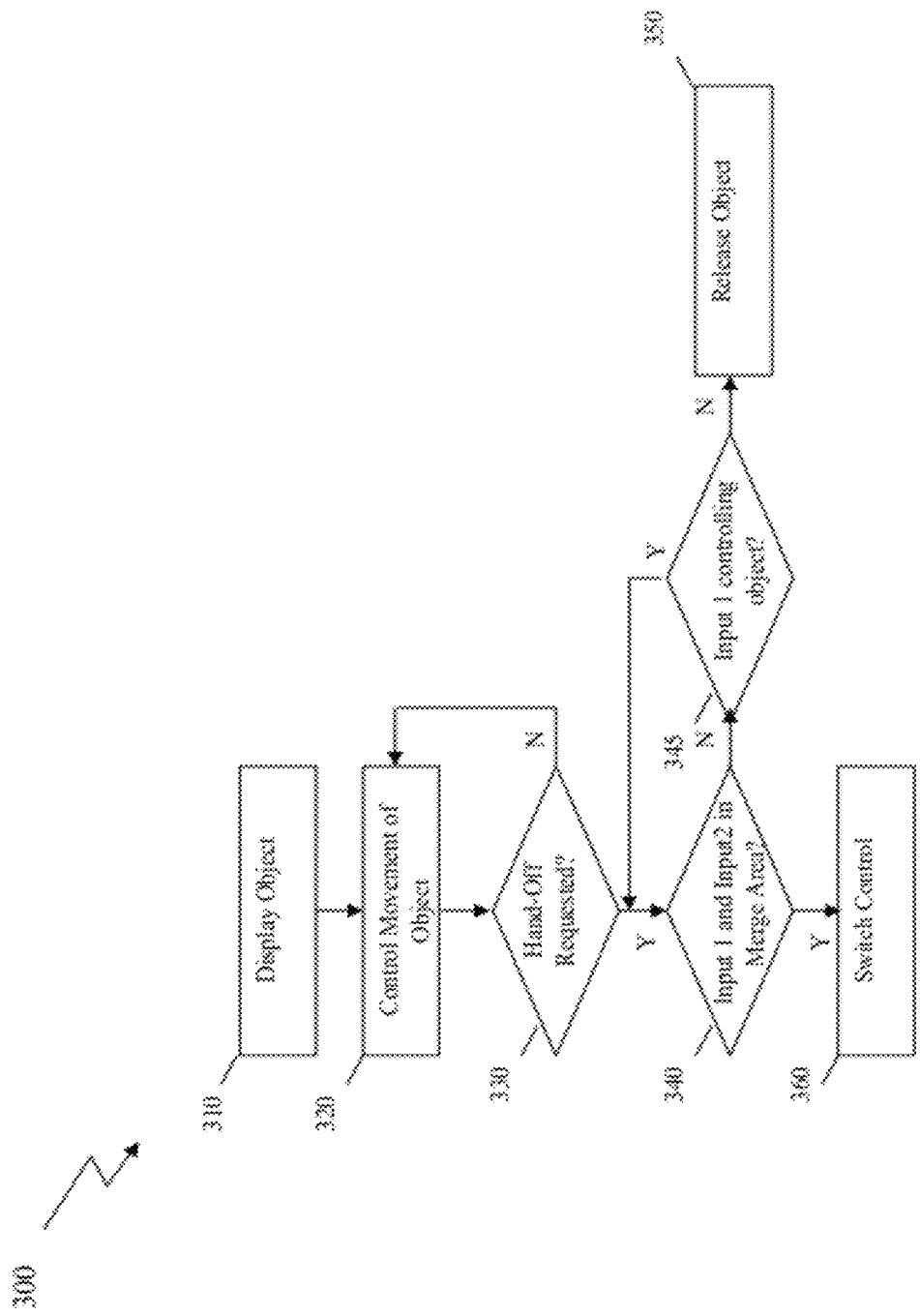
FIG. 3 illustrates a flow diagram of a method for switching control between a first input and second input is illustrated according to some embodiments.

Referring next to FIG. 3, a more detailed flow diagram of the method 300 for switching control between a first input and second input is illustrated according to one embodiment of the present invention.

First, in step 310, an object is displayed on a screen. For example, an object may be displayed on any display screen associated with the device 100, such as a touch sensitive or non-touch sensitive display screen attached to the device 100, or a touch sensitive or non-touch sensitive display screen external to the device 100. In one embodiment the screen is attached to a handheld device. In one embodiment, the screen may be a touch screen display. In another embodiment, the screen may be external to the device. Next, in step 320 a first touch input is received to control the movement of the object. For example, in one embodiment, the handheld device comprises a housing, and further comprises at least one touch sensitive panel attached to the housing of the handheld device. In one embodiment, the panel further comprises display capability, where in such embodiments the object is displayed on the touch panel. In one embodiment, the touch input is received by a user placing a finger on the panel and moving the object. In another embodiment, an alternate touch input device such as a pen may be used by the user. In step 320 the system receives the input and controls the movement of the object according to the touch input. In one embodiment, for example, a user guides an object by placing his/her finger on the object and moving the object across the screen.

Next, in step 330, a request for hand-off is detected at the handheld device. In One embodiment, the handoff request begins the process of switching control from the first input, e.g. first touch input, and a second input, e.g. second touch input. In one embodiment, while controlling movement of the object, the system may continuously monitor the one or more of the object, first input and second input until a hand-off request is detected. In one embodiment, a hand-off request may be detected when the user ceases control of the object. That is, in one embodiment, the user may be controlling the object using a first hand, e.g. right hand, and may reach a point at which the user can no longer comfortably control the object using that hand, at such time the user may lift his/her hand, and such cease of control may trigger the system to recognize a request for hand-off. In another embodiment, there may be a predefined gesture, such as a single or double click that may be interpreted by the system as the request for hand-off.

In yet another embodiment, the system may monitor the speed of the movement of the object by the first input and when the system detects an unexpected change in the speed of the movement of the object, the change may be interpreted as a request for handoff. In another embodiment, the system detects a second input at the handheld device, such as for example a second touch input entered on the touch sensitive panel or screen, and the detection is interpreted as a request for handing off control between the first input and second input. For example, in an embodiment where the user is controlling the object using a first touch input, e.g. first finger, at some point the user may place another touch input, e.g. a second finger, on the touch sensitive panel, and the system may interpret this as a request for switching control from a first touch input to a second touch input. In another embodiment, the system may detect the request for handoff once the object has passed a predefined threshold area. For example, in one embodiment, a system may assign a half way point, where it is determined that the control should be switched from one hand to another. In other embodiments, a combination of such methods may be used by the system to detect a request for hand-off.

If in step 330 a handoff is detected the process then moves to step 340. Otherwise, the system continues to control movement of the object according to the first input.

Next, in step 340 the system determines whether a second input is detected and within a merge area. In some embodiments, an indication of the first input and the second input may be displayed to the user in order to help the user place the second input where the hand-off can occur. For example, in one embodiment, the object is displayed and indicates the position of the input controlling the object. In one embodiment, an indication of the second input is also displayed on the screen so that the user is able to view the location of the inputs in relation to one another and in relation to the object. As stated above, in one embodiment, one or both the first input and the second input are touch inputs. In one embodiment, the merge area is defined as an area within which the control can be switched between the first input and the second input. In one embodiment, the merge area defines an area where the second input is at a location proximate to the object such that the control of the object can be passed to the second input. In one embodiment, the merge area may be a predefined area for the particular application that is running and/or the overall system at the handheld device. That is, the application developer and or system developer may designate a position on the input panel or screen defined as the merge area. In another embodiment, the merge area may be calculated relative to one or more of the location of the first input, the location of the second input and/or the location of the object. In one embodiment, the location of the first input, the second input and/or the object is determined at the time the request is detected. In some embodiments, the merge area may be calculated as a distance between the first input and the second input, a radius around the second input, a radius around the first input, or some combination thereof. In some embodiments, the speed of movement of the object by the first input, as well as other variables may be taken into account when calculating the merge area.

If it is determined that the second input is not detected within the merge area, in step 345, it is determined whether the first input is still controlling the object. That is, in one embodiment, the system will check to see whether the first input has ceased control of the object, for example by lifting the touch input from the object. In one embodiment, when the first input ceases control of the object the object will remain at the location where control was ceased for a predetermined amount of time t. In one embodiment, if in step 345 it is determined that the first input has ceased control of the object then in step 350, the object is released from control. In one embodiment, the system may notify the user before releasing the object. In one embodiment, after the object is released, it is returned to its original position before it was controlled by the first input. In another embodiment, the object remains at its current location, i.e. the location at which the first input ceased control of the object, after being released, e.g. the last known location of the first input.

If on the other hand in step 345 it is determined that the first input is still controlling the object, then the system will return to step 340 and monitor whether the second input is detected and within the merge area. In one embodiment, the system may wait for a predetermined time before releasing the object during which the system will continuously monitor for a second input and monitor the location of the second input to determine if the second input is detected and/or location of the second input is within the merge area. In one embodiment, the system may continue to monitor the location for as long as the object is being controlled, and may release the object once the first input ceases control of the object as determined in step 345.

If alternatively in step 340 it is determined that the second input is detected and within the merge area, in step 360 control is switched to the second input and the first input may be lifted and or cease control of the object. In one or more embodiments, during step 340 and/or 360 the location of the first input/object and the second input is monitored and once the location of the first input and second input is such that the second input is controlling the object, e.g. the second input is touching the object, control is switched to the second input. In step 360, in some embodiments, control of the object is released from the first input and switched to the second input. After this step is completed, the second input has control of the object in the application until another handoff request is detected.

Figure 4:
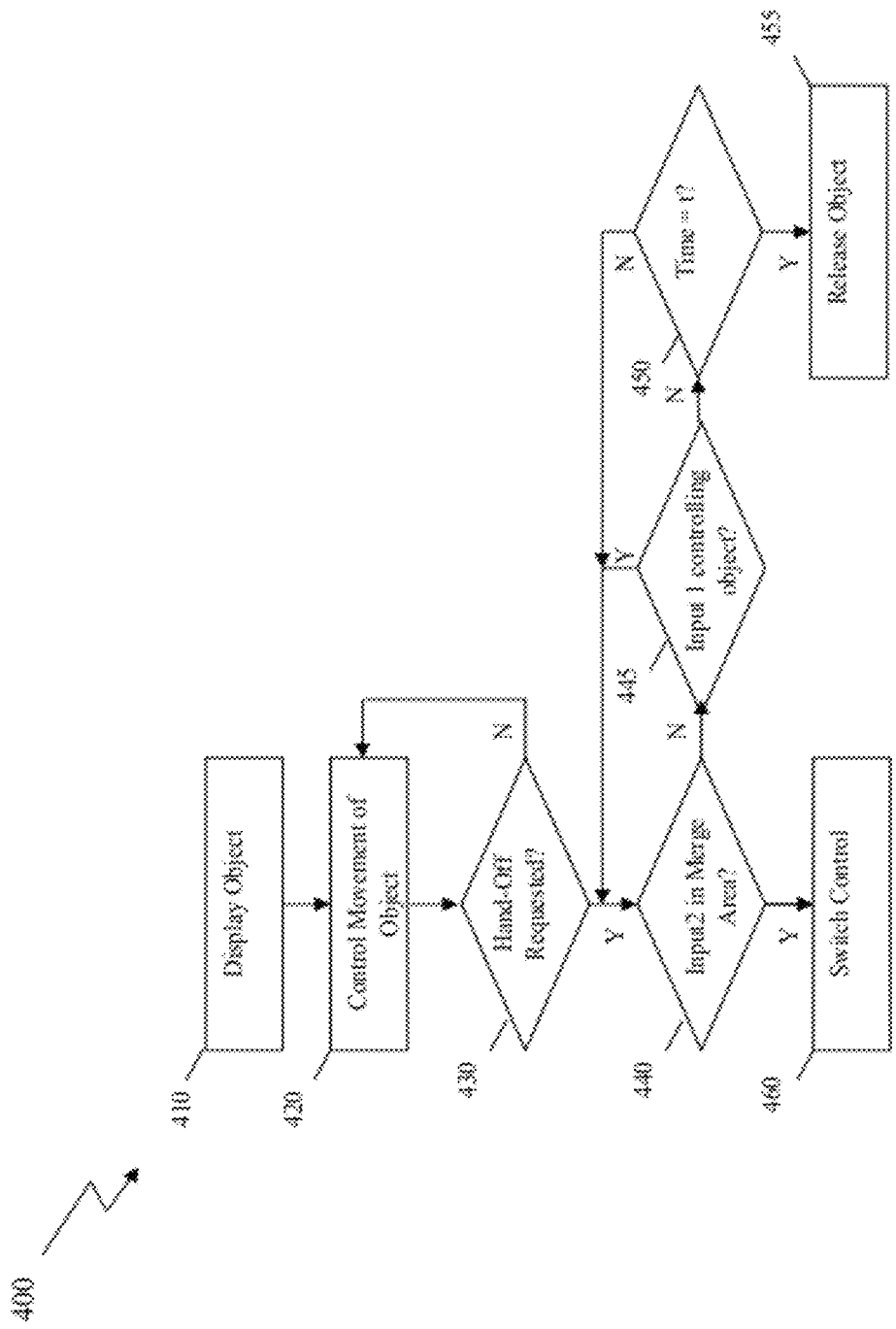
FIG. 4 illustrates a flow diagram of an alternative method for switching control between a first input and second input is illustrated according to one embodiment of the present invention.

Referring next to FIG. 4, a detailed flow diagram of an alternative method 400 for switching control between a first input and second input is illustrated according to one embodiment of the present invention.

First, in step 410, an object is displayed on a screen. For example, an object may be displayed on any display screen associated with the device 100, such as a touch sensitive or non-touch sensitive display screen attached to the device 100, or a touch sensitive or non-touch sensitive display screen external to the device 100. In one embodiment the screen is attached to a handheld device. In one embodiment, the screen may be a touch screen display. In another embodiment, the screen may be external to the device. Next, in step 420 a first touch input is received to control the movement of the object. For example, in one embodiment, the handheld device comprises a housing, and further comprises at least one touch sensitive panel attached to the housing of the handheld device. In one embodiment, the panel further comprises display capability, where in such embodiments the object is displayed on the touch panel. In one embodiment, the touch input is received by a user placing a finger on the panel and moving the object. In another embodiment, an alternate touch input device such as a pen may be used by the user. In step 420 the system receives the first input and controls the movement of the object according to the first touch input. In one embodiment, for example, a user guides an object by placing his/her finger on the object and moving the object across the screen.

Next, in step 430, a request for hand-off is detected at the handheld device. In One embodiment, while controlling movement of the object, the system may continuously monitor the one or more of the object, first input and second input until a hand-off request is detected. In one embodiment, the handoff request begins the process of switching control from the first input, e.g. first touch input, and a second input, e.g. second touch input. In one embodiment, a hand-off request may be detected when the user ceases control of the object. That is, in one embodiment, the user may be controlling the object using a first hand, e.g. right hand, and may reach a point at which the user can no longer comfortably control the object using that hand, at such time the user may lift his/her hand, and such cease of control may trigger the system to recognize a request for hand-off. In another embodiment, there may be a predefined gesture, such as a single or double click that may be interpreted by the system as the request for hand-off.

In yet another embodiment, the system may monitor the speed of the movement of the object by the first input and when the system detects an unexpected change in the speed of the movement of the object, the change may be interpreted as a request for handoff. In another embodiment, the system detects a second input at the handheld device, such as for example a second touch input entered on the touch sensitive panel or screen, and the detection is interpreted as a request for handing off control between the first input and second input. For example, in an embodiment where the user is controlling the object using a first touch input, e.g. first finger, at some point the user may place another touch input, e.g. a second finger, on the touch sensitive panel, and the system may interpret this as a request for switching control from a first touch input to a second touch input. In another embodiment, the system may detect the request for handoff once the object has passed a predefined threshold area. For example, in one embodiment, a system may assign a half way point, where it is determined that the control should be switched from one hand to another. In other embodiments, a combination of such methods may be used by the system to detect a request for hand-off.

If in step 430 a handoff is detected the process then moves to step 440. Otherwise, the system continues to control movement of the object according to the first input.

Next, in step 440 the system determines whether a second input is detected and within a merge area. In one embodiment, the merge area defines an area where the second input is at a location proximate to the object such that the control of the object can be passed to the second input. In one embodiment, an indication of the first input and the second input may be displayed to the user in order to help the user place the second input where the hand-off can occur. For example, in one embodiment, the object is displayed and indicates the position of the input controlling the object. In one embodiment, an indication of the second input is also displayed on the screen so that the user is able to view the location of the inputs in relation to one another and in relation to the object. As stated above, in one embodiment, one or both the first input and the second input are touch inputs. In one embodiment, the merge area is defined as an area within which the control can be switched between the first input and the second input. In one embodiment, the merge area defines an area where the second input is at a location proximate to the object such that the control of the object can be passed to the second input.

In one embodiment, the merge area may be a predefined area for the particular application that is running and/or the overall system at the handheld device. That is, the application developer and or system developer may designate a position on the input panel or screen defined as the merge area. In another embodiment, the merge area may be calculated relative to one or more of the location of the first input, the location of the second input and/or the location of the object. In one embodiment, the location of the first input, the second input and/or the object is determined at the time the request is detected. In some embodiments, the merge area may be calculated as a distance between the first input and the second input, a radius around the second input, a radius around the first input, or some combination thereof. In some embodiments, the speed of movement of the object by the first input, as well as other variables may be taken into account when calculating the merge area.

If it is determined that the second input is not detected within the merge area, in step 445, it is determined whether the first input is still controlling the object. That is, in one embodiment, the system will check to see whether the first input has ceased control of the object, for example by lifting the touch input from the object. In one embodiment, when the first input ceases control of the object the object will remain at the location where control was ceased for a predetermined amount of time t to allow for the second input to take control of the object.

In one embodiment, the predetermined time t may be defined by the system or specific program, e.g. game application. In another embodiment, the predetermined period may additionally or alternatively be customizable by the user. In another embodiment, the system or application may adjust the predefined period based on the user characteristics over time. For example, in one embodiment, the system may determine that a user has a pattern of a longer delay between the inputs and may adjust the predetermined time to reflect this delay.

In one embodiment, if in step 445 it is determined that the first input has ceased control of the object then in step 450, it is determined whether the predetermined time t has lapsed. For example, in one embodiment, when the first input ceases control of the object, then a timer may be initiated to keep track of the time that has lapsed where the object is not being controlled by any input. In one embodiment, during this predetermined period the object remains at the last known position of first input.

If in step 450, it is determined that the time has lapsed, then the process moves to step 455 and the object is released from control. In one embodiment, the system may notify the user before releasing the object. In one embodiment, after the object is released, it is returned to its original position before it was controlled by the first input. In another embodiment, the object remains at its current location, i.e. the location at which the first input ceased control of the object, after being released, e.g., the last known location of the first input.

If on the other hand it step 445 it is determined that the first input is still controlling the object or if in step 450 it is determined that the time t has not lapsed, then the system will return to step 440 and monitor whether the second input is detected and within the merge area.

In one embodiment, the system will continuously monitor for the second input And monitor the location of the second input to determine if the second input is detected and/or location of the second input is within the merge area for as long as the first input controls the object (step 445) or the predetermined time has not lapsed since the first input ceased control of the object (step 450) and will release the object once neither of the conditions of step 445 and step 450 are met.

When in step 440 it is determined that the second input is detected and within the merge area, in step 460 control is switched to the second input and the first input may be lifted and or cease control of the object. In some embodiments, control of the object is released from the first input and switched to the second input. After this step is completed, the second input has control of the object in the application until another handoff request is detected.

In one or more embodiments, during step 440 and/or 460 the location of the first input/object and the second input is monitored and once the location of the first input and second input is such that the second input is controlling the object, e.g. the second input is touching the object, control is switched to the second input. In one embodiment, a second time period t2 may be allowed to ensure that the location of the second input is at a location relative to the object to allow for control of the object. In one or more embodiments, an indication of the first input and the second input may be displayed to the user in order to help the user place the second input where the hand-off can occur. For example, in one embodiment, the object is displayed and indicates the position of the input controlling the object. In one embodiment, an indication of the second input is also displayed on the screen so that the user is able to view the location of the inputs in relation to one another and in relation to the object.

Next, an alternative embodiment of the present invention is described in which control is pitched/passed from one input to a second input.

In general, in some embodiments, the first touch input may toss or pitch and object on a touch sensitive panel in a way that causes the object to travel a distance and allows the user to catch the object with the second touch input during its trajectory. For example, an object may be displayed on any display screen associated with the device 100, such as a touch sensitive or non-touch sensitive display screen attached to the device 100, or a touch sensitive or non-touch sensitive display screen external to the device 100. The user uses a first finger to select and move the displayed object using a touch sensitive panel attached to the device 100, such as a touchscreen located on either side of the device 100, or a touchpad located on either side of the device 100. This first finger is referred to herein as a first touch input. Next the first finger may cause a pitching or tossing of the displayed object by for example, creating a tossing motion on the touch sensitive panel, which causes the object to travel a distance across the screen.

Next, the user touches the touch sensitive panel with a second finger to which the user wants to hand-off the displayed object. This second finger is referred to herein as a second touch input. A processing system associated with device 100 tracks the movement of the object as it traverses a distance according to the pitch and ignores the user's second finger until the object and the second touch input merge, at which point the second input may begin controlling the object. After that point the system tracks the user's second finger and moves the object in accordance with movements of the second finger.

Figure 5A:
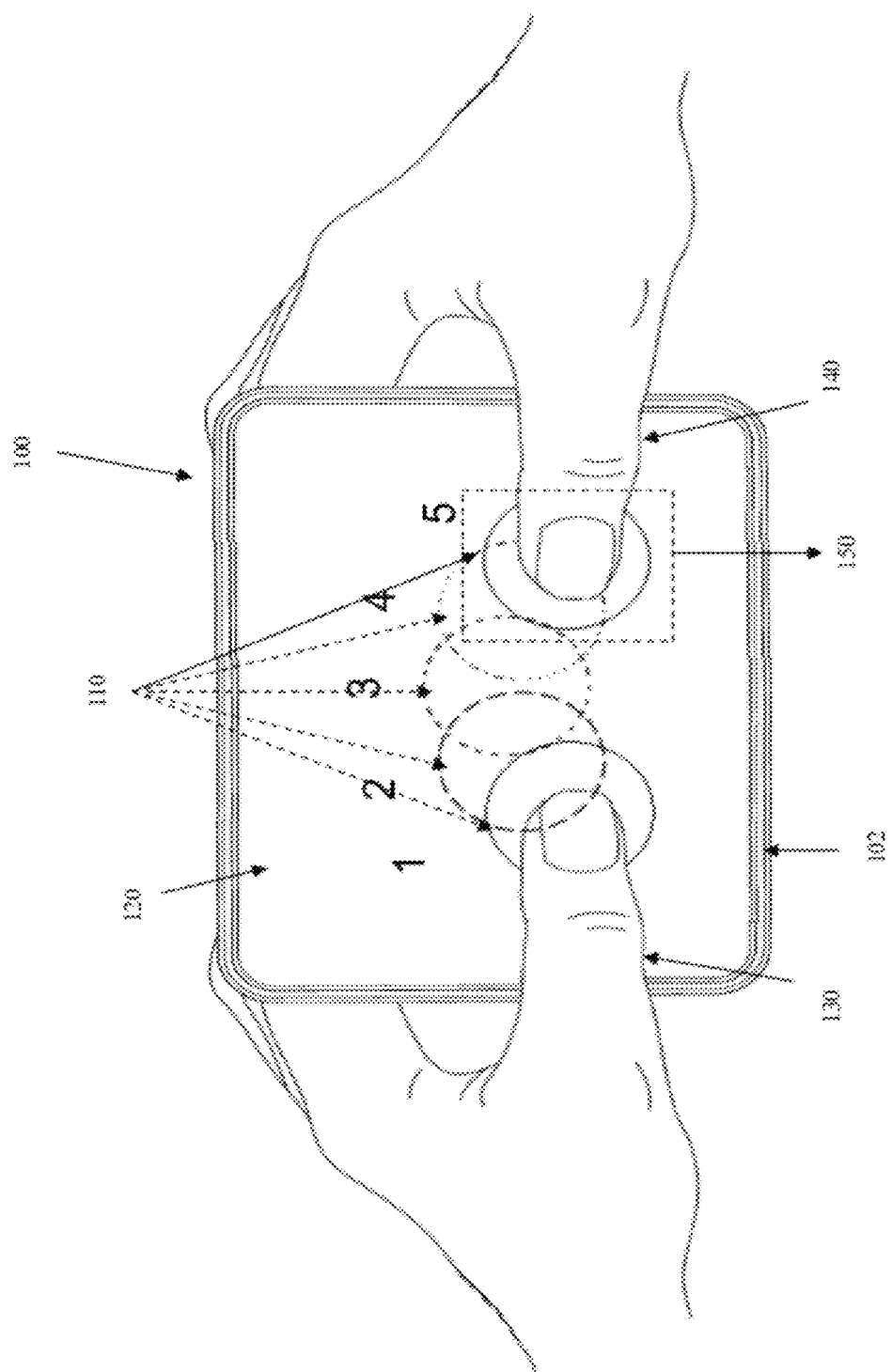
FIG. 5A illustrates an exemplary touch sensitive device displaying an object according to one or more embodiments of the present invention.

Referring to FIG. 5A, an exemplary touch sensitive device displaying an object is illustrated according to one or more embodiments of the present invention.

As illustrated, in this exemplary embodiment, a user is interacting with an application running on the device 100. The device 100 is shown as being a rectangular shaped device, having a housing 102, a touch sensitive screen 120, wherein the touch sensitive screen 120 comprises a display for viewing the application as it is being manipulated. In other embodiments, the device 100 may only comprise a touch pad, and the application may be displayed on an external device such as a TV. In yet another embodiment, the device 100 may not have touch capability, and the user may instead control the object using other control means such as a rolling ball, push buttons, joystick, etc. For example, in the illustrated embodiment, the device 100 comprises a housing 102 having a size intended for hand-held use and further comprises at least one touch sensitive panel 102 attached to the housing of the hand-held device. In one embodiment, the device 100 may further comprise a processor-based system included in the housing for performing one or more methods as described in more detail below. The application that is running on the device may comprise any type of application, such as for example any of the types of applications mentioned above.

In one embodiment, as illustrated, the user is controlling an object 110 using a first hand 130, e.g. the left hand as shown in FIG. 5A. As shown, the user is able to pitch the object from a first position (1) to a second position (5) using his/her first finger. In one embodiment, the user pitches the object from position (1), such that the pitch causes the object to travel a distance, e.g. from position (1) to position (5) on the screen. In one embodiment, while the object is traveling across the screen a second input 140 may be detected at the device 100. An example process of detecting a second input is described in detail below with respect to FIGS. 5B and 6.

In one embodiment, the system recursively monitors the position of the object 110 as it is traveling a distance across the screen. In one embodiment, the system determines that the object 110 and a second input source 140 are within a merge area 150, and the control of the object is switched to the second input 140. In one embodiment, the merge area 150 may be displayed to the user. For example, the user may be able to view the merge area, in order to determine what area to enter the second input. In another embodiment, the merge area is not displayed to the user.

As shown, the user's second hand 140 in this exemplary embodiment represents the second touch input. In one embodiment, the location of the second input 140 (right hand) of the user is determined by the system, and compared against the location of the object, e.g. positions (1), (2), (3), (4) and (5). As shown in the exemplary embodiment of FIG. 5A, at position (5) the location of both the second input, and the position of the object, are within the merge area 150. Therefore, in this exemplary embodiment when the object is at the position (5), the system will proceed to switch control of the object to the second input, i.e., user's right hand/finger 140. In some embodiments, after control has been switched according to the process 500, and/or 600 described below, the second input 140 may then begin control of the object and may move the object across the screen.

Figure 5B:
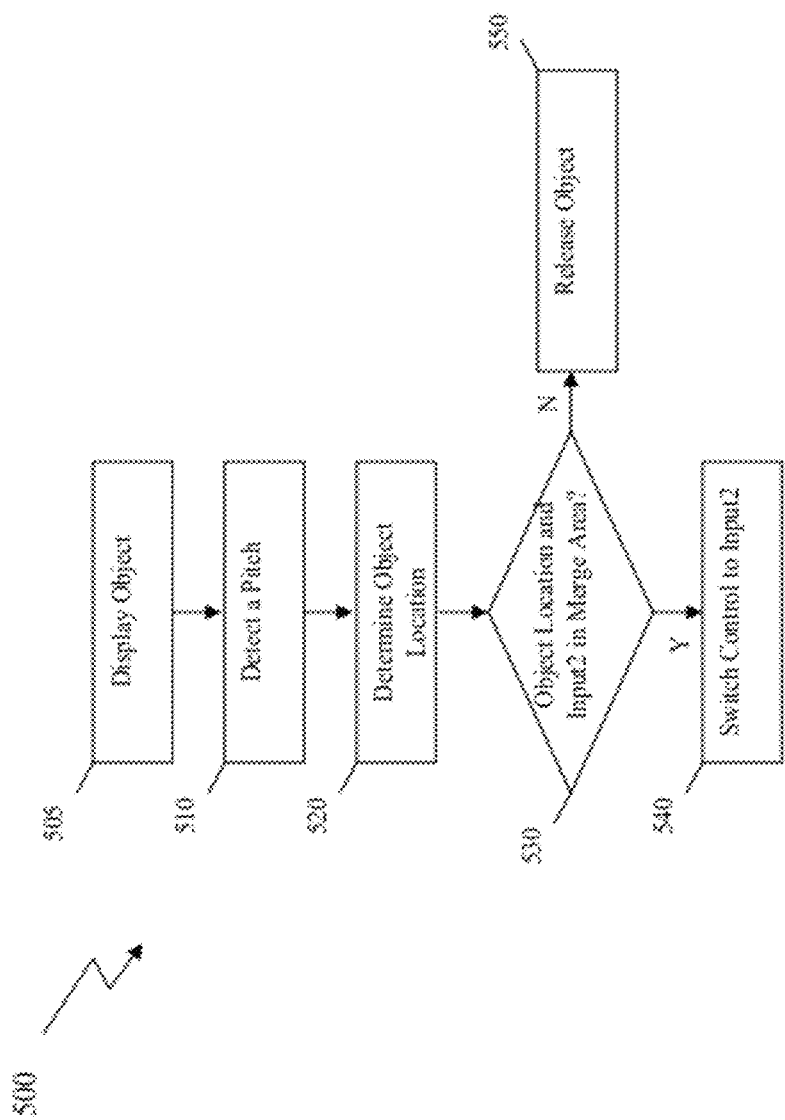
FIG. 5B illustrates a flow diagram of a process for pitching control of an object, according to several embodiments of the present invention.

Referring next to FIG. 5B, a flow diagram of a process 500 for pitching control of an object is illustrated, according to several embodiments. First, in step 505, an object is displayed. For example, an object may be displayed on any display screen associated with the device 100, such as a touch sensitive or non-touch sensitive display screen attached to the device 100, or a touch sensitive or non-touch sensitive display screen external to the device 100. In one embodiment the object is displayed on the touch sensitive display of the handheld device. In another embodiment the object is displayed on a display that is separate from the touch sensitive device or the touch sensitive panel where inputs are received. In one embodiment some time during the displaying of the object, the object is controlled by a first input entered at the device. For example, in one embodiment, a first touch input at the touch sensitive panel/display controls the movement of the object.

During this time, in step 510, a pitch of the object by the first input is detected at the device. For example, in one embodiment, the system may monitor the speed of the movement of the object by the first input and when the system detects an unaccepted change in the speed of the movement of the object, the change may be interpreted as a pitch. In some embodiment, a sudden halt in movement and/or control of the object by the first input may indicate the object has been pitched. In another embodiment, there may be a predefined gesture, such as a single or double click that may be interpreted by the system as the request for handoff. In yet another embodiment, the direction of movement of the object may alert the system that the object is being pitched. In one embodiment, the user may create a pitching or tossing motion alerting the system that the object is being pitched. In other embodiments, a combination of these and other indicators may be used by the system to detect a pitch.

In one embodiment, upon detection that an object is being pitched the system begins automatic control of the object through a determined path. In one embodiment, the pitch of the object will cause the object to travel a distance across the screen. In one embodiment, the path through which the object travels is determined according to one or more of the velocity of the pitch, the weight of the object, the environment of the particular application that is running, and other similar values. For example, in one embodiment, the user may adjust the path by adjusting a setting determining the speed at which the object will travel, the distance it will travel or the projection of the object.

Next, in step 520 the system determines the current location of the pitched object. In some embodiments, the speed of the object at and/or prior to the pitch is used to determine the current location. In another embodiment, the weight of the object may be additionally or alternatively used in determining the current location. In yet another embodiment, the context of the application environment may be used to determine the current location. For example, in one embodiment, the application may comprise a game, and other objects and or effects in the game may be taken into consideration in addition or in lieu of the properties of the object. As an example, in one embodiment, the system may determine that the object will be traveling through a distance having road blocks. In such embodiment, the slowing of the speed of the object in result of contact with such road blocks will be taken into account.

Once the current location of the object is determined, the process moves to step 530, and determines whether the current location and a second input are within a merge area. As described above, in one embodiment, the merge area is defined as an area within which control can be switched between a first input and a second input. In one embodiment, the merge area may be a predefined area for the particular application that is running In another embodiment, the merge area is calculated as a distance between the first input and the second input, a distance between the object location and the second input, a radius around the second input, a radius around the object, or some combination thereof. In some embodiments, the speed of movement of the object, by the first input, as well as other properties of the object and/or other objects within the application may be taken into account when calculating the merge area.

If in step 530 it is determined that the location of the object and the second input are within the merge area, in step 540, the control of the object is switched to the second input. After this step is completed, the second input has control of the object in the application, until another handoff or pitch is detected. In one embodiment, prior to step 540, there may be a period of time where the object is not being controlled by either of the first or second input. For example, in one embodiment, the first input may release control of the object once the object is pitched in step 510. In some embodiments, the system may automatically control the object during this time until the control is switched to the second input. In one embodiment, the system may automatically control the object as it is traveling a distance across the screen, based on several different variables such as the speed or at the time of movement, force of the pitch, and/or direction of movement of the object prior to the pitch in step 510, location of the second input, the context of the application, predefined user or system settings, etc. In some embodiments, the movement of the object during its trajectory may also be automatically adjusted. For example, in one embodiment, a smoothing effect may be applied to the object to create a smooth movement of the object. In another embodiment, the actual trajectory route of the object may be calculated. In one embodiment, if this actual trajectory results in some unexpected route or road block the system may automatically adjust the trajectory to allow the object to reach the intended destination location.

Alternatively, if in step 530 it is determined that the first and second input are not within the merge are, in step 550, the object is released from control once it has traversed the distance intended by the pitch, e.g. reached a destination location. In one embodiment, the system may wait for a predetermined time before releasing the object during which the system will continuously monitor the location of the object and the second input to determine if the locations are within the merge area. In another embodiment, the system may notify the user before releasing the object. In one embodiment, when the object is released it will remain at the final location until another input is entered to control the object. In yet another embodiment, upon being released, the object may be returned to its original location at the time of the pitch, i.e. the location just prior to step 510.

Figure 6:
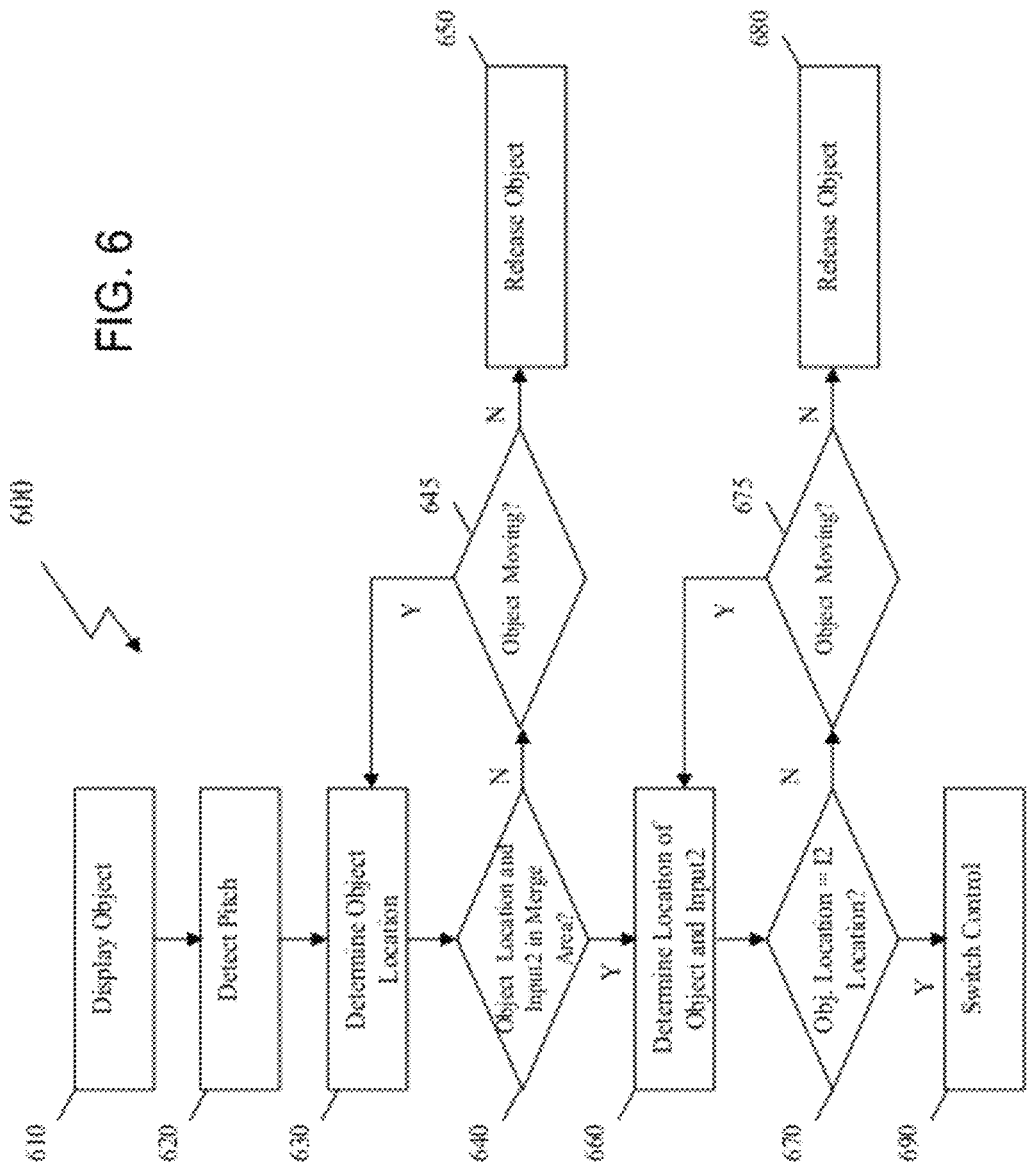
FIG. 6 illustrates a flow diagram of a process for pitching control of an object, according to several embodiments of the present invention.

Referring next to FIG. 6, a more detailed flow diagram of a process 600 for pitching control from a first input to a second input is illustrated according to some embodiments.

First, in step 610, an object is displayed. In one embodiment the object is displayed on the touch sensitive display of the handheld device. In another embodiment the object is displayed on a display that is separate from the touch sensitive device or the touch sensitive panel where inputs are received. In one embodiment, the display may be external to the handheld device, while in other embodiments, the display is integrated. In one embodiment some time during the displaying of the object, the object is controlled by a first input entered at the device. For example, in one embodiment, a first touch input at the touch sensitive panel/display controls the movement of the object.

As the user is controlling the object, in step 610 the object is continuously monitored, until in step 620 a pitch is detected. For example, in one embodiment, the position, speed, direction of movement and other properties of the object are monitored. Further, in some embodiments, the manner of control of the first input may be monitored during step 610. In some embodiments, the system may monitor the speed of the movement of the object by the first input and when the system detects an unexpected change in the speed of the movement of the object, the change may be interpreted as a pitch in step 620. In one embodiment, a sudden halt in movement and/or control of the object by the first input may indicate the object has been pitched. In another embodiment, there may be a predefined gesture, such as a single or double click that may be interpreted by the system as the request for handoff. In yet another embodiment, the direction of movement of the object may alert the system that the object is being pitched. In other embodiments, a combination of these and other methods may be used by the system to detect a pitch. In one embodiment, the system may continue to monitor the object until a pitch is detected.

In one embodiment, the pitch of the object causes the object to traverse a path across the screen. In one embodiment, the path the object will travel is determined based on several different factors. According to several embodiments, the path through which the object will travel is determined according to one or more of the velocity of the pitch, the weight of the object, the application environment, and other similar values. For example, in one embodiment, the user may adjust the path by adjusting a setting determining the speed at which the object will travel, the distance it will travel or the projection of the object. In one embodiment, upon detection that an object is being pitched the system begins automatic control of the object through a determined path.

In one embodiment, once a pitch is detected in step 620, the system may begin automatic control of the object. For example, in one embodiment, the first input may release control of the object once the object is pitched in step 620. In some embodiments, the system may automatically control the object during this time until the control is switched to the second input. In one embodiment, the system may automatically control the object, as it is traveling a distance across the screen, based on several different variables such as the speed of movement, force of the pitch, and/or direction of movement of the object prior to the pitch in step 610, location of the second input, the context of the application, predefined user or system settings, etc. In some embodiments, the movement of the object during its trajectory may also be automatically adjusted. In one embodiment, a smoothing effect may be applied to the object to create a smooth movement of the object. In another embodiment, the actual trajectory route of the object may be calculated. In one embodiment, if this actual trajectory results in some unexpected route or road block the system may automatically adjust the trajectory to allow the object to reach the intended destination location.

Once a pitch is detected in step 620 the system moves onto step 630. In step 630 the system monitors the current location of the pitched object. That is, the system determines the location at which the pitched object is currently located. In one embodiment, during step 630 the current location of the object is recursively determined during the trajectory/traversal of the object across a distance on the screen until the object halts and stops moving or alternatively until a user input begins control of the object.

In one embodiment, the location of the object is determined based on determining the path of traversal of the object in response to the pitch and thereafter determining the location at different time intervals with respect to the determined path of the object. In some embodiments, the speed of the object at time of and/or just prior to the pitch may be used to determine the current location of the object. In another embodiment, the weight of the object may be additionally or alternatively used in determining the location. In yet another embodiment, the application environment may be used to determine the location of the object. For example, in one embodiment, other objects and or effects in an application may be taken into consideration in addition to or in lieu of the properties of the object. As an example, in one embodiment, the system may determine that the object will be traveling through a distance having road blocks. In such embodiment, the slowing of the speed of the object in result of contact with such road blocks will be taken into account when determining the current location of the object.

After determining the current location of the object in step 630, the process continues to step 640, and determines whether the object location and the location of the second input are within the merge area. As described above, in one embodiment, the merge area is defined as an area within which control can be switched to the second input. In one embodiment, the merge area may be a predefined area for the application. In another embodiment, the merge area is calculated as a distance between the first input and the second input, a distance between the destination location and the second input, a radius around the second input, a radius around the destination location, or some combination thereof. In some embodiments, the speed of movement of the object, by the first input, as well as other properties of the object and/or other objects within the application may be taken into account when calculating the merge area.

If in step 640 it is determined that the current location of the object and second input are not within the merge area, in step 650 the object is released and will not be controlled until another input is detected. In one embodiment, the determination in step 640 is recursively made until the object halts movement and/or lands. That is, in some embodiments, when it is determined in step 640 that the current location of the object and the second input are not within a merge location, in step 645 the system determines whether the object is still moving and/or traversing in response to the pitch. If in step 645 it is determined that the object is still moving then the process returns to step 630 and repeats the steps 630, 640 and 645 recursively until it is either determined that the location of the object and the second input is within the merge area (step 640), or that the object has stopped moving across the screen (645).

If it is determined, in step 645 that the object has stopped moving, then the object is released. In one embodiment, when the object is released it will remain at the final location until another input is entered to control the object. In yet another embodiment, upon being released, the object may be returned to its original location at the time of the pitch, i.e. the location just prior to step 620.

Next, if it is determined that the destination location and the location of second input are within the merge area, in step 660 the system continues to monitor and determine the location of the object and the second input to determine whether they are at location where the control can be switched to the second input. In step 670 the system determines if the second input is at the location of the object. If it is determined, that the location of the object and the location of the second input are equal, then the system moves to step 280, and switches control of the object to the second input.

Alternatively, if it determined in step 670 that the object is not at the second input, then the system, in step 675, determines if the object is still in movement across the screen in response to the pitch. In one embodiment, according to the method 600, the system may continue to recursively determine, i.e., monitor the movement of the object and the second input until they are at the same location such the control of the object can be handed off to the second input or alternatively when the object halts movements, i.e. lands. If at any point during the monitoring of the location of the object and the second input it is determined that the second input and the object are at the same location (step 670) then the system continues to step 690 and switches control of the object to the second input.

Alternatively, if at any point during the monitoring of the movement, it is determined in step 675 that the object has stopped moving, when it has been determined that the object location and the second input are not such that the control of the object may be switched, then in step 680 the object is released. In one embodiment, when the object is released it will remain at the final location until another input is entered to control the object. In yet another embodiment, upon being released, the object may be returned to its original location at the time of the pitch, i.e. the location just prior to step 610.

In some embodiments, during the monitoring of the location of the object and second input in order to switch control of the object, the location of the object may be adjusted to be placed at the location of the second input to allow switching of the control. That is, in some embodiments, the object may be automatically moved as to be at the location of the second input. As described above, in some embodiments, the system may automatically control the object during the time the control is switched from the first input to the second input. In such embodiments, the position of the object may be automatically adjusted to be at the location of the second input. Alternatively, in some embodiments, the location of the object may be fixed and the user may be prompted to change the location of the second input. In one embodiment, the location of the object is only adjusted when it is within a predetermined distance from the second input. In one embodiment, the system may automatically move the object based on several different variables such as the speed of movement and/or direction of movement of the object prior to the handoff request, location of the second input, the context of the application, predefined user or system settings, etc.

After the location of the object is adjusted to be at the second input, the system continues to step 690 and switches control of the object to the second input.

As mentioned above, the device 100 (FIGS. 1 and 5A) may comprise any type of device, such as a handheld computing device or a controller for an external device or system not shown. It is believed that many such devices will employ touch sensitive panel technology, and as such, embodiments of the present invention may be implemented in any such devices.

For example, in some embodiments the device 100 may comprise a handheld game controller used for controlling an external game or entertainment system. Traditionally, handheld game controllers are provided to the user for controlling objects within a computer game. In some embodiments, where the device 100 comprises a handheld game controller, the device 100 may be configured to be held using two hands and to be controlled by the user using buttons and/or other means of control, as well as including one or more touch sensitive panels that operate in accordance with one or more embodiments of the present invention. Such a controller uses touch sensitive panel technology as a means of controlling objects within games being played. For example, such game controllers may be provided with a user interface having a touchpad and/or touchscreen for controlling objects within the game.

As another example, in some embodiments the device 100 may comprise a portable gaming device. Such a device also uses touch sensitive panel technology as a means of controlling objects within games being played. The one or more touch sensitive panels may operate in accordance with one or more embodiments of the present invention.

Thus, the methods and system of the present invention may be used with any devices capable of employing one or more embodiments of the systems and methods described herein. The touch sensitive panel devices allow control of an object using touch technology.

Figure 7:
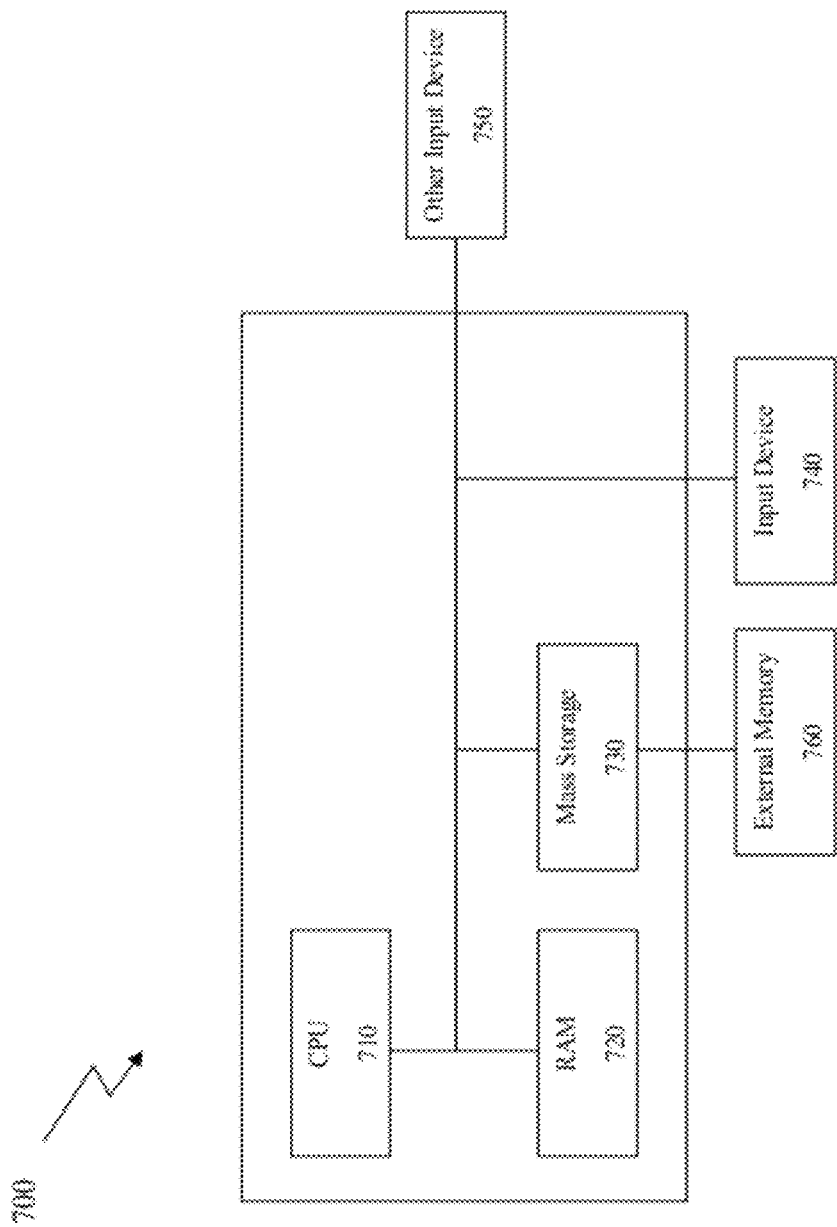
FIG. 7 illustrates a system diagram of a system for implementing one or more of the methods and apparatuses of the present invention according to several embodiments of the present invention.

The methods and techniques described herein may be utilized, implemented and/or run on many different types of systems, including for example computers, game consoles, entertainment systems, etc. Referring to FIG. 7, there is illustrated a system 700 that may be used for any such implementations. One or more components of the system 700 may be used for implementing any system or device mentioned above, such as for example the handheld device. However, the use of the system 700 or any portion thereof is certainly not required. For example, in one embodiment, a handheld device may be implemented having one or more elements of the system 700. In another embodiment, a handheld controller may be implemented using some of the elements of the system 700, while other elements of the system may reside in the game console associated with the handheld controller and separate from the handheld controller.

By way of example, the system 700 may include, but is not required to include, a central processing unit (CPU) 710, a random access memory (RAM) 720, and a mass storage unit 730, such as a disk drive. The system 700 may be coupled to, or integrated with, any of the other components described herein, such as an input device 750 and other input device 760. The system 700 comprises an example of a processor based system. The CPU 710 may be used to execute or assist in executing the steps of the methods and techniques described herein. In one embodiment, the system 700 may further comprise a GPU to execute or assist in executing the steps of the methods and techniques described herein.

In some embodiments, the input device 740 may comprise a touch sensitive panel/display. Furthermore, in one embodiment, the system 700 comprises other input device 750 such as buttons, keyboard, mouse, joystick, etc. In another embodiment, other input device 750 may further comprise output means, such as stereo, displays, light emitters, etc. In one embodiment one or more of the input device 740 and other input device 750 comprise display functionality. In one embodiment various program content, images, shadows, lighting, etc. may be rendered on one or more of the input device 740, and other input device 750.

The mass storage unit 730 may include or comprise any type of computer readable storage or recording medium or media. The computer readable storage or recording medium or media may be fixed in the mass storage unit 730, or the mass storage unit 730 may optionally include external memory 760, such as a digital video disk (DVD), Blu-ray disc, compact disk (CD), USB storage device, floppy disk, or other media. By way of example, the mass storage unit 730 may comprise a disk drive, a hard disk drive, flash memory device, USB storage device, Blu-ray disc drive, DVD drive, CD drive, floppy disk drive, etc. The mass storage unit 730 or external memory 760 may be used for storing program code or macros that implement the methods and techniques described herein.

Thus, external memory 760 may optionally be used with the mass storage unit 730, which may be used for storing program code that implements the methods and techniques described herein. However, any of the storage devices, such as the RAM 720, mass storage unit 730 or external memory 760, either alone or in combination may be used for storing such program code. For example, any of such storage devices may serve as a tangible computer readable storage medium for storing or embodying a computer program for causing a console, system, computer, or other processor based system to execute or perform the steps of any of the methods, code, and/or techniques described herein. Furthermore, any of the storage devices, such as the RAM 720, mass storage unit 730 or external memory 760, may be used for storing any needed database(s), gestures, lists, macros, etc.

In some embodiments, a processor-based apparatus may be used for executing or performing any of the above-described steps, methods, and/or techniques. Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, and/or techniques described herein.

For example, in some embodiments the present invention provides a computer readable storage medium storing one or more computer programs adapted to cause a processor based system to execute steps comprising displaying an object on a screen, controlling movement of the object in response to a first touch input, detecting a request for switching control of the object from the first touch input to a second touch input, determining whether a location of the first touch input and a location of the second touch input are within a merge area, and switching control of the object from the first touch input to the second touch input in response to the location of the first touch input and the location of the second touch input being within the merge area.

In another embodiment the present invention provides a computer readable storage medium storing one or more computer programs adapted to cause a processor based system to execute steps comprising displaying an object on a screen, detecting a pitch of the object from a first touch input controlling the object, wherein the pitch causes the object to travel a distance on the screen, determining whether a location of the object and a location of a second touch input are within a merge area, and switching control of the object to the second touch input when it is determined that the location of the object and the second touch input are within the merge area.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

While the invention herein disclosed has been described by means of specific embodiments, examples and applications thereof, numerous modifications and variations could be made thereto by those skilled in the art without departing from the scope of the invention set forth in the claims.

What is claimed is:

1. A method, comprising:
displaying an object on a screen;
controlling movement of the object in response to a first touch input;
detecting a request for switching control of the object from the first touch input to a second touch input, wherein detecting the request comprises monitoring a velocity of the object;
determining whether a location of the first touch input and a location of the second touch input are within a merge area; and
switching control of the object from the first touch input to the second touch input in response to the location of the first touch input and the location of the second touch input being within the merge area.

2. The method of claim 1, further comprising determining the merge area.

3. The method of claim 1, wherein the merge area is a predefined area.

4. The method of claim 1, wherein the merge area comprises an area surrounding a location of the first touch input at the time the request is detected.

5. The method of claim 1, wherein the merge area comprises an area surrounding the first touch input and the second touch input, wherein a distance between the location of the first touch input and the location of the second touch input is within a predetermined range.

6. The method of claim 1, wherein the merge area comprises an area surrounding the location of the second touch input at the time the request is detected.

7. The method of claim 1, wherein detecting the request comprises detecting the second touch input when the object is being controlled by the first touch input.

8. The method of claim 1, wherein detecting the request comprises detecting that the location of the first touch input has reached a threshold hand-off location.

9. The method of claim 1, wherein detecting the request further comprises detecting a decrease in the velocity of the object over a predetermined amount of time.

10. The method of claim 1, wherein detecting the request comprises detecting a halt in the movement of the object for a predetermined amount of time.

11. The method of claim 1, further comprising releasing the object if it is determined that the location of the first touch input and the location of the second touch input are not within the merge area.

12. The method of claim 1, wherein the first touch input and the second touch input are entered on a first touch sensitive panel.

13. The method of claim 12, wherein the touch sensitive panel comprises a touch sensitive display.

14. The method of claim 1, wherein the touch sensitive display comprises the screen.

15. The method of claim 1, wherein the controlling movement of the object in response to a first touch input includes controlling movement of the object in response to movement of the first touch input.

16. The method of claim 1, wherein the determining whether a location of the first touch input and a location of the second touch input are within a merge area includes determining whether a location of the first touch input and a location of the second touch input are fully within a merge area and wherein the switching control of the object from the first touch input to the second touch input in response to the location of the first touch input and the location of the second touch input being within the merge area further comprises switching control of the object from the first touch input to the second touch input in response to the location of the first touch input and the location of the second touch input being fully within the merge area.

17. The method of claim 1, wherein the detecting a request for switching control of the object from the first touch input to a second touch input further include detecting a predefined user gesture as a request for switching control of the object, wherein the predefined user gesture is one of a single click, a double click, and removal of the first touch input from the screen.

18. An apparatus, comprising:
a housing having a size intended for handheld use;
a first touch sensitive panel attached to a first surface of the housing; and
a processor based system included in the housing configured to perform steps comprising:
displaying an object on a screen;
controlling movement of the object in response to a first touch input on the first touch sensitive panel;
detecting a request for switching control of the object from the first touch input to a second touch input, wherein detecting the request comprises monitoring a velocity of the object;
determining whether a location of the first touch input and a location of the second touch input are within a merge area; and
switching control of the object from the first touch input to the second touch input in response to the location of the first touch input and the location of the second touch input being within the merge area.

19. The apparatus of claim 18, wherein the processor based system is further configured to determine the merge area.

20. The apparatus of claim 19, wherein the merge area is determined upon detecting the request.

21. The apparatus of claim 18, wherein the merge area is a predefined area.

22. The apparatus of claim 18, wherein detecting the request comprises detecting the second touch input when the object is being controlled by the first touch input.

23. The apparatus of claim 18, wherein detecting the request comprises detecting that the location of the first touch input has reached a threshold hand-off location.

24. The apparatus of claim 18, wherein the processor based system is further configured to release the object if it is determined that the location of the first touch input and the location of the second touch input are not within the merge area.

25. The apparatus of claim 18, wherein the touch sensitive panel comprises a touch sensitive display.

26. The apparatus of claim 25, wherein the touch sensitive display comprises the display.

27. The apparatus of claim 18, wherein the screen is external to the device.

28. A computer readable storage medium storing one or more computer readable programs adapted to cause a processor based system to execute steps comprising:
displaying an object on a screen;
controlling movement of the object in response to a first touch input;
detecting a request for switching control of the object from the first touch input to a second touch input, wherein detecting the request comprises monitoring a velocity of the object;

determining whether a location of the first touch input and a location of the second touch input are within a merge area; and switching control of the object from the first touch input to the second touch input in response to the location of the first touch input and the location of the second touch input being within the merge area.

\* \* \* \* \*

UNITED STATES PATENT AND TRADEMARK OFFICE
CERTIFICATE OF CORRECTION

| | | |
|---|---|---|
| PATENT NO. | : 8,907,903 B2 | Page 1 of 1 |
| APPLICATION NO. | : 13/006337 | |
| DATED | : December 9, 2014 | |
| INVENTOR(S) | : Erich Peter Waas | |

It is certified that error appears in the above-identified patent and that said Letters Patent is hereby corrected as shown below:

On The Title Page, Item (56), in the References Cited, in U.S. PATENT DOCUMENTS, in the right hand column, Line 5, delete "Beemink et al." and insert --Beernink et al.--, therefor.

Signed and Sealed this
Twenty-first Day of April, 2015

Michelle K. Lee
*Director of the United States Patent and Trademark Office*